(12) United States Patent
Lin et al.

(10) Patent No.: US 12,564,800 B2
(45) Date of Patent: Mar. 3, 2026

(54) BACKFLOW-PREVENTING FILTER MODULE

(71) Applicant: KEMFLO INTERNATIONAL CO., LTD., Pingtung City (TW)

(72) Inventors: Sheng-Nan Lin, Pingtung City (TW); Hao-Chan Wei, Pingtung City (TW); Ming-Chieh Chung, Pingtung City (TW); Ming-Chung Lin, Pingtung City (TW)

(73) Assignee: KEMFLO INTERNATIONAL CO., LTD., Pingtung City (TW)

( * ) Notice: Subject to any disclaimer, the term of this patent is extended or adjusted under 35 U.S.C. 154(b) by 372 days.

(21) Appl. No.: 18/500,688

(22) Filed: Nov. 2, 2023

(65) Prior Publication Data

US 2025/0018317 A1    Jan. 16, 2025

(30) Foreign Application Priority Data

Jul. 12, 2023    (TW) ................................. 112126059

(51) Int. Cl.
   *B01D 27/10* (2006.01)
   *B01D 35/30* (2006.01)
(52) U.S. Cl.
   CPC ......... *B01D 27/108* (2013.01); *B01D 35/306* (2013.01); *B01D 2201/301* (2013.01)
(58) Field of Classification Search
   None
   See application file for complete search history.

(56) References Cited

U.S. PATENT DOCUMENTS

| | | | | |
|---|---|---|---|---|
| 10,011,355 B1 * | 7/2018 | Williams | ................ | B64D 11/04 |
| 2010/0170857 A1 * | 7/2010 | Williams | ............. | B01D 35/147 |
| | | | | 210/120 |
| 2024/0238706 A1 * | 7/2024 | Qiu | ........................ | B01D 35/30 |

FOREIGN PATENT DOCUMENTS

| | | | | |
|---|---|---|---|---|
| ES | 2752009 T3 * | 4/2020 | ............. | C02F 1/001 |
| JP | 4117864 B2 * | 7/2008 | ........... | B01D 35/153 |

* cited by examiner

*Primary Examiner* — Krishnan S Menon
(74) *Attorney, Agent, or Firm* — MUNCY, GEISSLER, OLDS & LOWE, P.C.

(57)    ABSTRACT

A backflow-preventing filter module includes a filter unit and a backflow-prevention valve. The filter unit includes a filter cartridge that has a connector formed with an annular groove, and a filter shell that defines an accommodating space and that includes a connecting head. The connecting head has an inner surrounding wall defining an annular slot. The backflow-prevention valve is sleeved on the connector, and has a fixing portion disposed in the annular groove and an abutting portion moveable between an open position, where a distal end of the abutting portion is pushed by water to be away from the inner surrounding wall so that the annular slot is not blocked, and a closed position, where the abutting portion is expanded to abut the distal end thereof against the inner surrounding wall, thereby blocking the annular slot.

8 Claims, 8 Drawing Sheets

BACKFLOW-PREVENTING FILTER MODULE

CROSS-REFERENCE TO RELATED APPLICATION

This application claims priority to Taiwanese Invention Patent Application No. 112126059, filed on Jul. 12, 2023, the entire disclosure of which is incorporated by reference herein.

FIELD

The disclosure relates to a filtering module, and more particularly to a backflow-preventing filter module.

BACKGROUND

A conventional household water purifier has a lid that has an inlet for connection to a raw water source and an outlet for outlet of filtered water, a filter shell that is removably connected to the lid, and a filter cartridge that is disposed in the filter shell. To replace the filter cartridge, the inlet is first separated from the raw water source. Next, the lid is removed from the filter shell. Then, a new filter cartridge is installed.

However, the filter shell may be misplaced after the lid is removed, thereby running a risk of the filter shell being tipped over and residual water being spilled from the filter shell onto a floor or a user, so replacement of the filter cartridge may be less smooth.

SUMMARY

Therefore, an object of the disclosure is to provide a backflow-preventing filter module that can alleviate at least one of the drawbacks of the prior art.

According to the disclosure, the backflow-preventing filter module is adapted to be connected to a lid. The lid has a lid body, an inlet groove, a positioning groove, and an outlet groove. The lid body has an inlet and an outlet. The inlet groove is in fluid communication with the inlet for connection with a raw water source. The positioning groove is in fluid communication with and disposed downstream of the inlet groove. The outlet groove is disposed downstream of the positioning groove, and interconnects the positioning groove and the outlet for outlet of filtered water therethrough. The backflow-preventing filter module includes a filter unit and a backflow-prevention valve. The filter unit includes a filter cartridge and a filter shell. The filter cartridge has a connector, a filtering member, and an annular groove. The connector is adapted to be connected to the lid body, and has an internal space that is adapted to be in fluid communication with the outlet groove.

The filtering member is adapted for filtering and purifying water, and defines a filtering space that is in fluid communication with the internal space of the connector. The annular groove is formed in the connector. The filter shell encloses the filter cartridge, and defines an accommodating space accommodating the filter cartridge. The filter shell includes a shell body, and a connecting head that is disposed at a top of the shell body and that is adapted to be inserted fixedly into the positioning groove. The connecting head has an inner surrounding wall that defines an annular slot surrounding an axis. The annular slot has a lower opening that is in fluid communication with the accommodating space, and an upper opening that is disposed at a top of the connecting head and that is adapted to be in fluid communication with the inlet groove. The backflow-prevention valve is sleeved on the connector, and has a fixing portion that is disposed in the annular groove, and an abutting portion that extends outwardly from the fixing portion towards the accommodating space and that is movable between an open position and a closed position. When the abutting portion is in the open position, a distal end of the abutting portion opposite to the fixing portion is pushed by water, which flows from the inlet groove, to be away from the inner surrounding wall, so that the annular slot is not blocked. When the abutting portion is in the closed position, the abutting portion is expanded to abut the distal end thereof against the inner surrounding wall, thereby blocking the annular slot.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
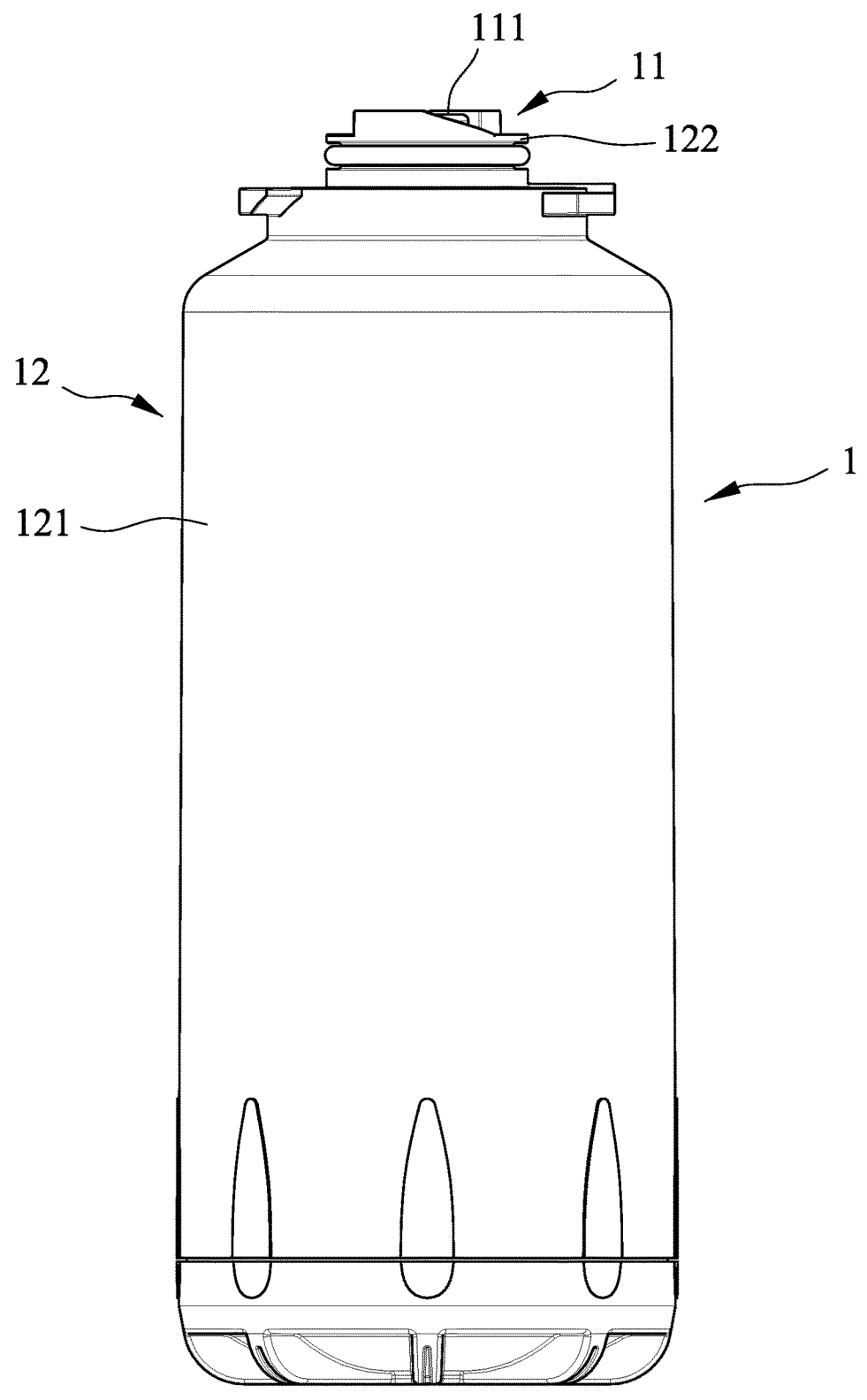
FIG. 1 is a side view illustrating a first embodiment of a backflow-preventing filter module according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
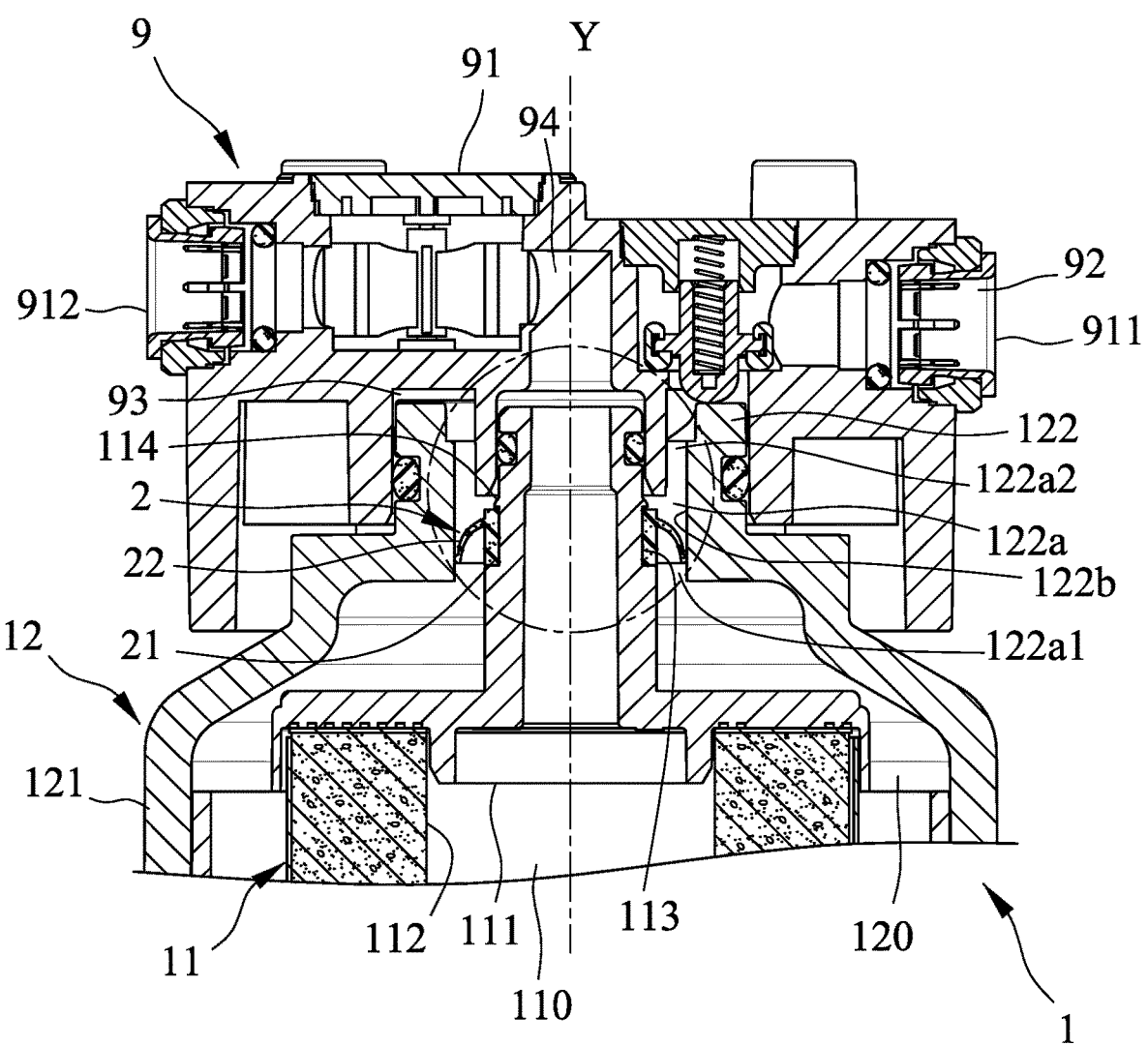
FIG. 2 is a fragmentary sectional view of a first embodiment illustrating an abutting portion of a backflow-prevention valve in a closed position.
Figure 3:
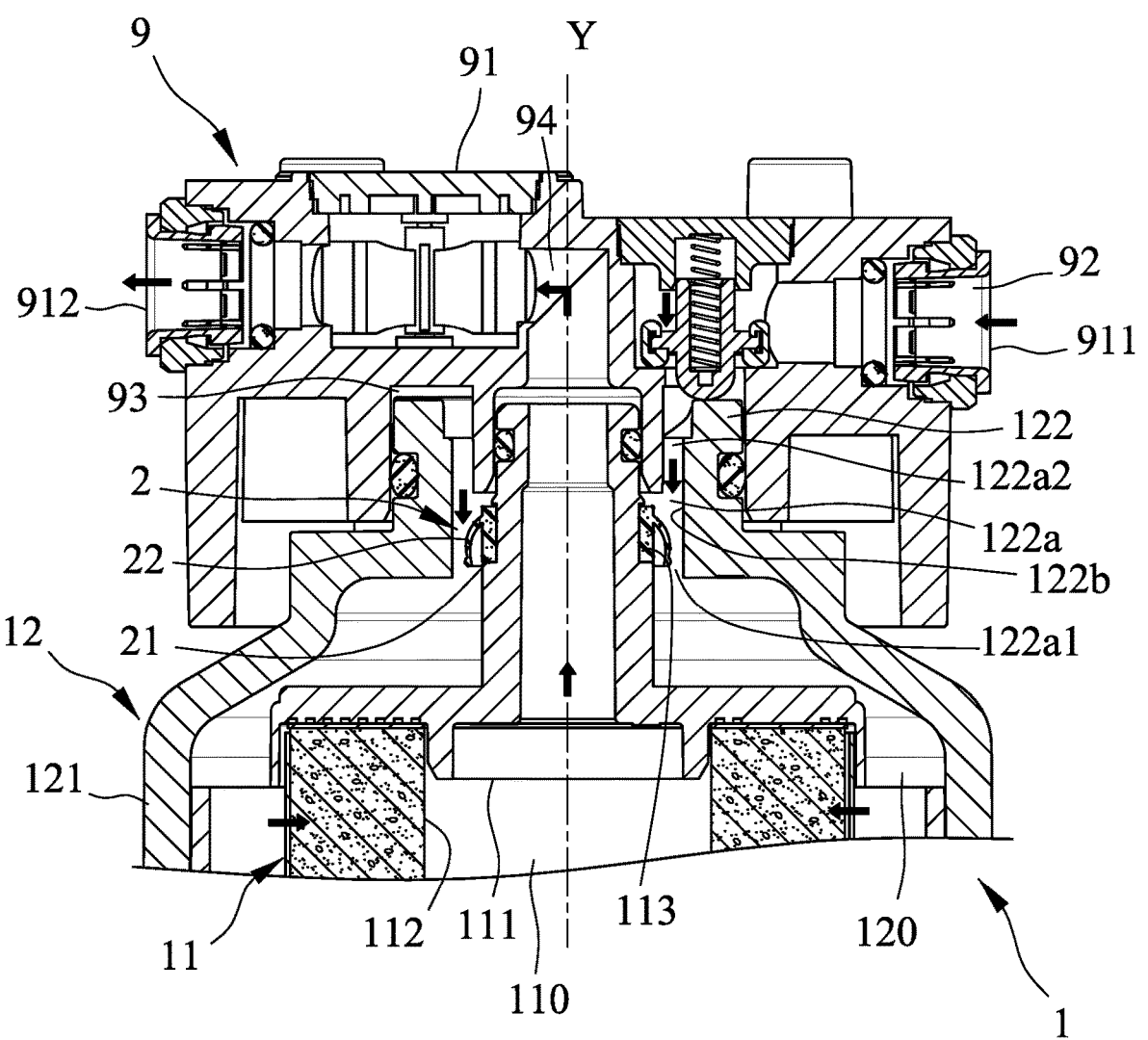
FIG. 3 is a view similar to FIG. 2, but illustrating the abutting portion of the backflow-prevention valve in an open position.

Referring to FIGS. 1 to 3, a first embodiment of the backflow-preventing filter module according to the disclosure is adapted to be connected to a lid 9. The lid 9 has a lid body 91 that has an inlet 911 and an outlet 912, an inlet groove 92 that is in fluid communication with the inlet 911 for connection with a raw water source, a positioning groove 93 that is in fluid communication with and disposed downstream of the inlet groove 92, and an outlet groove 94 that is disposed downstream of the positioning groove 93 and that interconnects the positioning groove 93 and the outlet 912 for outlet of filtered water therethrough. The first embodiment lets in water from the raw water source flowing into the inlet 911 and inlet groove 92, and filtered and purified water flows out of the first embodiment into the outlet groove 94 and outlet 912.

The first embodiment includes a filter unit 1, and a backflow-prevention valve 2 connected to the filter unit 1. The filter unit 1 includes a filter cartridge 11, and a filter shell 12 that encloses the filter cartridge 11 and that defines an accommodating space 120 accommodating the filter cartridge 11. The material of the filter shell 12 may be made of polypropylene (PP) or styrene-acrylonitrile resin (SAN), and may be transparent for observation of a condition of filter cartridge 11.

Figure 4:
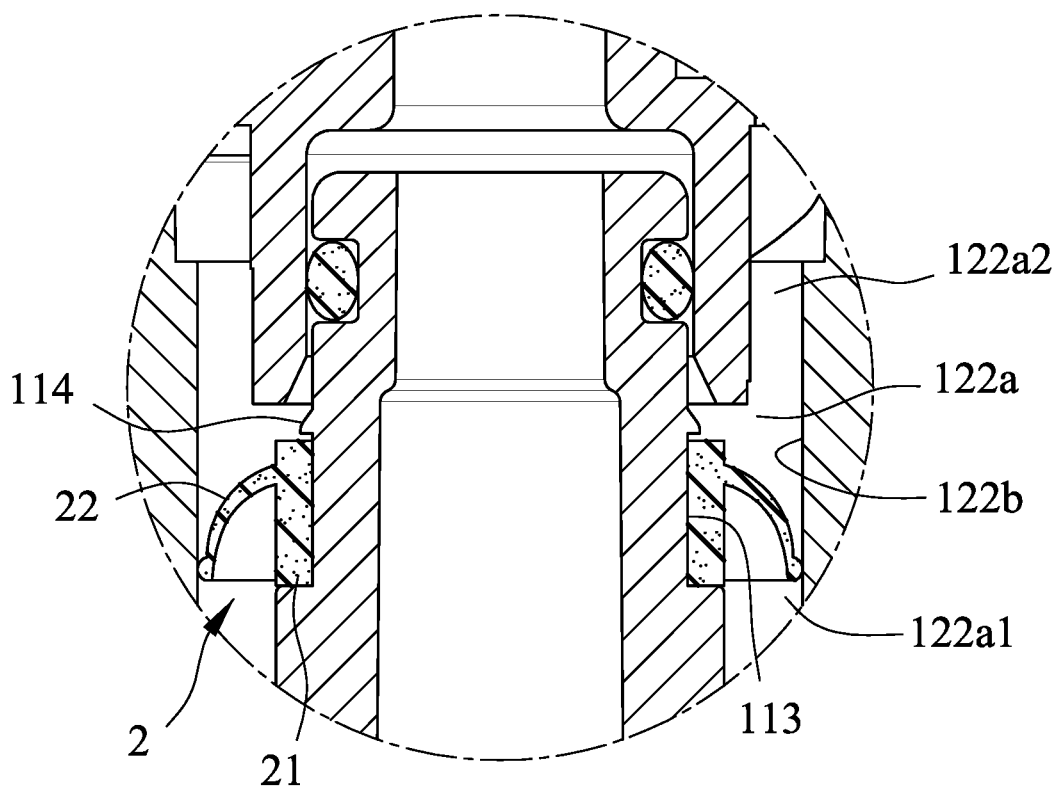
FIG. 4 is an enlarged fragmentary sectional view of the first embodiment illustrating the backflow-prevention valve being disposed in an annular groove.

Referring to FIGS. 1, 2, and 4, the filter cartridge 11 has a connector 111 adapted to be connected to the lid body 91 and having an internal space that is adapted to be in fluid communication with the outlet groove 94, a filtering member 112 adapted for filtering and purifying water and defining a filtering space 110 that is in fluid communication with the internal space of the connector 111, an annular groove 113 formed in the connector 111, and a protrusion 114 protruding from the connector 111, disposed above the annular groove 113, surrounding an axis (Y) and spaced apart from the filter shell 12. The protrusion 114 has a top end that is opposite to the annular groove 113 and that is beveled.

In this embodiment, the connector 111 is adapted to be tightly connected to the outlet groove 94 to prevent the water from leaking, and the annular groove 113 is adapted to be spaced apart from the lid 9 with the protrusion 114 protruding in between. The bevel configuration of the protrusion 114 allows for easy installation of the backflow-prevention valve 2 when the backflow-prevention valve 2 is installed downwardly onto the connector 111. A material of the filtering member 112 may be activated carbon, pleated paper, ceramics, copper-zinc alloy (KDF filter cartridge), Ion-exchange resin, polypropylene cotton, polypropylene membrane, hollow fiber membrane, or reverse osmosis membrane.

The filter shell 12 has a shell body 121, and a connecting head 122 that is disposed at a top of the shell body 121 and that is adapted to be inserted fixedly into the positioning groove 93. The connecting head 122 has an inner surrounding wall 122b that defines an annular slot 122a surrounding the axis (Y). The inner surrounding wall 122b is spaced apart from an outer surface of the connector 111 and the protrusion 114.

The annular slot 122a has a lower opening 122a1 that is in fluid communication with the accommodating space 120, and an upper opening 122a2 that is disposed at a top of the connecting head 122 and that is adapted to be in fluid communication with the inlet groove 92. Specifically, a portion of the connector 111 extends beyond the upper opening 122a2 and is fluidly connected to the outlet groove 94. The upper opening 122a2 is directly connected to a peripheral edge of the inlet groove 92. Such configuration allows the water from the raw water source to flow into the annular slot 122a, and to further flow out of the connector 111 through the lower opening 122a1 into the accommodating space 120.

The backflow-prevention valve 2 is sleeved on the connector 111, and has a fixing portion 21 that is disposed in the annular groove 113, and an abutting portion 22 that extends outwardly from the fixing portion 21 towards the accommodating space 120, and that is movable between an open position (see FIG. 3) and a closed position (see FIG. 2). The fixing portion 21 is fittingly disposed in the annular groove 113, so that the fixing portion 21 is not movable relative to the connector 111 along the axis (Y). The abutting portion 22 is made from a flexible material that may be polyethylene (PE), polypropylene (PP), ethylene-vinyl acetate (EVA), polymethyl methacrylate (PMMA), carbon fiber reinforced polymer (CFRP), or a material with high impact tolerance and flexibility.

When the lid 9 is tightly connected to the connecting head 122, the connector 111 is connected with the outlet groove 94, the annular slot 122a is connected to the inlet groove 92 and the raw water source, and the connector 111 is connected to the outlet groove 94 and the outlet 912.

Referring to FIGS. 1 to 3, when the first embodiment is in use, the water from the raw water source flows from the inlet 911 and the input groove 92 into the annular slot 122a, and the abutting portion 22 of the backflow-prevention valve 2 is driven to switch between the open position and the closed position due to waterflow and flexibility of abutting portion 22. When the abutting portion 22 is in the open position, a distal end of the abutting portion 22 opposite to the fixing portion 21 is pushed by the water, which flows from the inlet groove 92, to be away from the inner surrounding wall 122b, so that the annular slot 122a is not blocked, thereby allowing the water to flow into the accommodating space 120, and the water is then filtered and purified when passing through the filtering member 112 and into the filtering space 110. When the filtering member 112 continuously filters the water, the filtered water overflows the connector 111 and flows into the outlet groove 94.

When the filtering member 112 is saturated and is no longer capable of filtering water, the filter cartridge 11 may then be replaced. During replacement of the filter cartridge 11, the lid 9 may be separated from the filter shell 12 with a normal wrench or a housing wrench. At this time, no water flows in the annular slot 122a from the upper opening 122a2 toward the lower opening 122a1, so that the abutting portion 22 is expanded to the closed position due to its flexibility to abut the distal end thereof against the inner surrounding wall 122b, thereby blocking the annular slot 122a and preventing the residual water in the accommodating space 120 from flowing through the upper opening 122a2 and spilling out when the filter unit 1 is tilted over.

Figure 5:
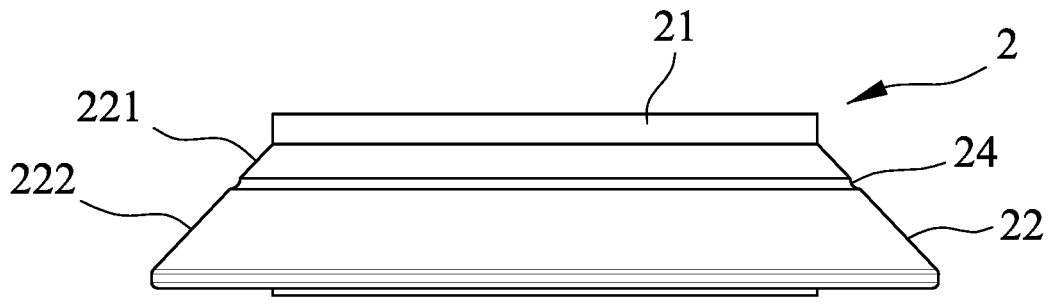
FIG. 5 is a side view illustrating the backflow-prevention valve of a second embodiment of the disclosure.
Figure 6:
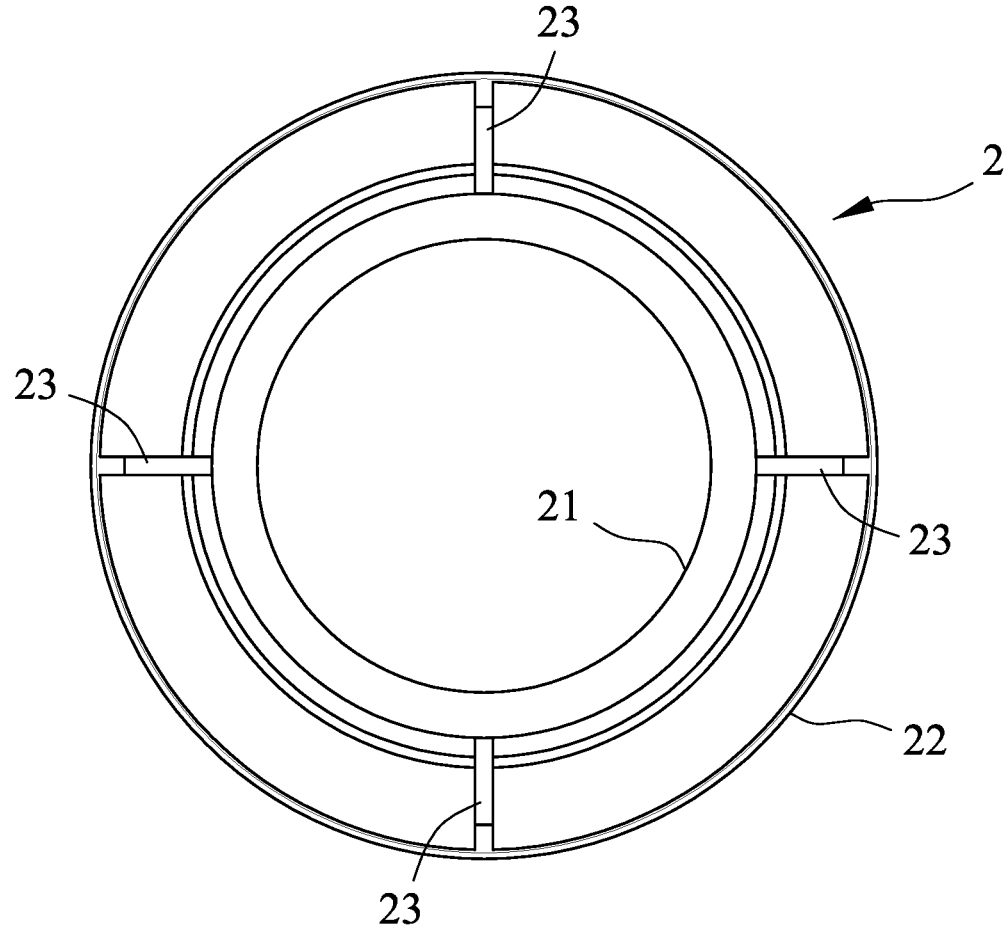
FIG. 6 is a bottom view illustrating a plurality of ribs of the backflow-prevention valve of the second embodiment.
Figure 7:
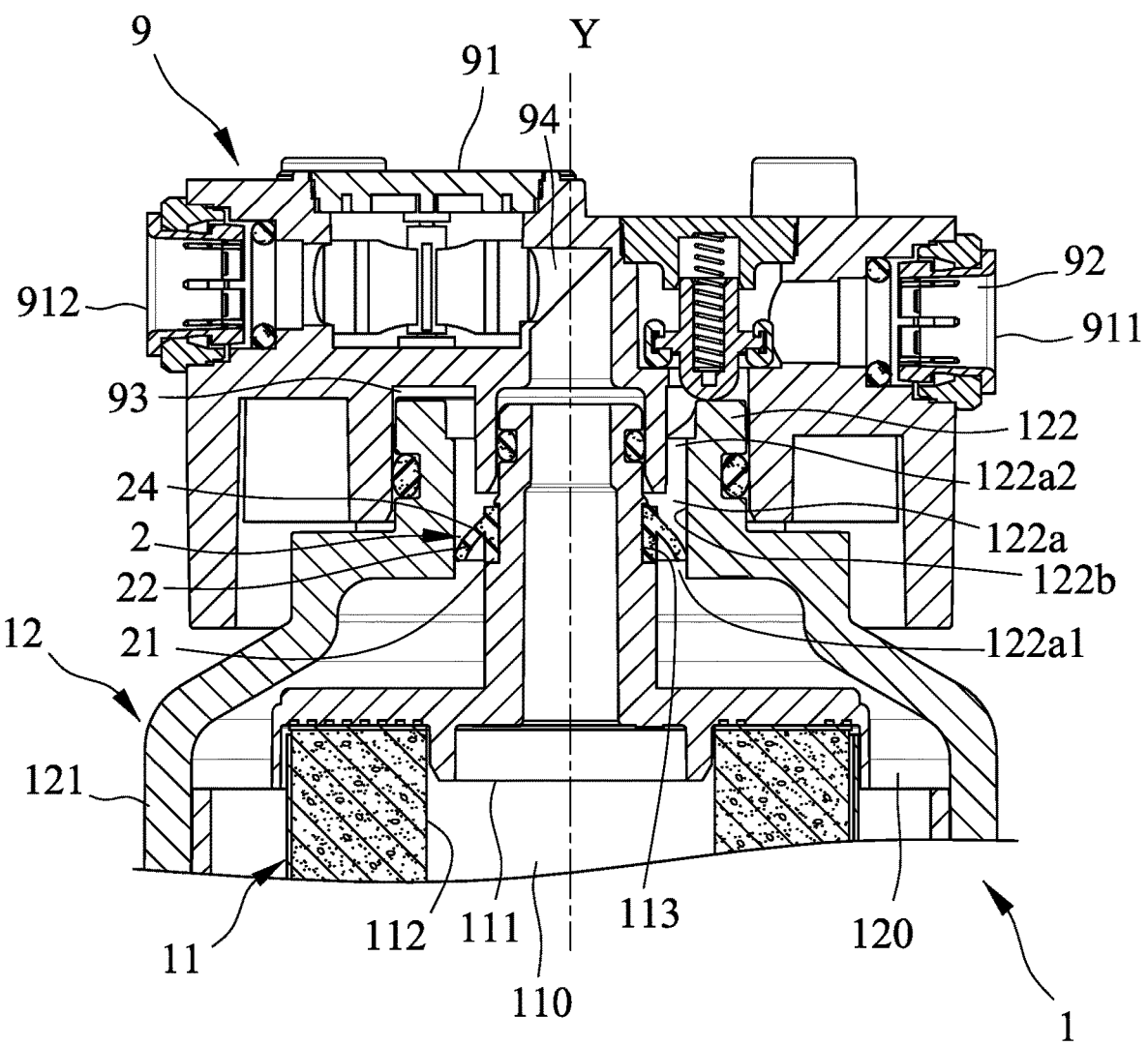
FIG. 7 is a fragmentary sectional view of the second embodiment.

Referring to FIGS. 5 to 7, a second embodiment of the backflow-preventing filter module according to the disclosure is similar to the first embodiment, the differences therebetween reside in the following. In this embodiment, the backflow-prevention valve 2 further has four ribs 23 that are disposed around the fixing portion 21, that are spaced apart from each other, and that extend from the fixing portion 21 to the abutting portion 22. The backflow-prevention valve 2 further has a recess 24 that is formed in the abutting portion 22 and that surrounds and is proximate to the fixing portion 21. The recess 24 is formed on an upper surface of the abutting portion 22 as shown in FIG. 5, and the ribs 23 are disposed beneath the abutting portion 22 as shown in FIG. 6.

Specifically, the recess 24 divides the abutting portion 22 into a maintaining section 221 that is proximate to the fixing portion 21, and a bending section 222 that is distal from the fixing portion 21. Through the configuration of the recess 24, a portion where the maintaining section 221 and the bending section 222 are connected has a smaller thickness, so that the bending section 222 may be moved away more easily from the inner surrounding wall 122*b* by the waterflow, thereby facilitating movement of the abutting portion to the open position and causing the water to flow more smoothly into the accommodating space 120. Furthermore, the ribs 23 may strengthen a structure of the abutting portion 22, so when the bending section 222 is moved away from the inner surrounding wall 122*b*, the structure of the abutting portion 22 is maintained, and the abutting portion 22 may be moved back to the closed position through flexibility of a material thereof and prevent the water from flowing out through the upper opening 122*a*2.

Figure 8:
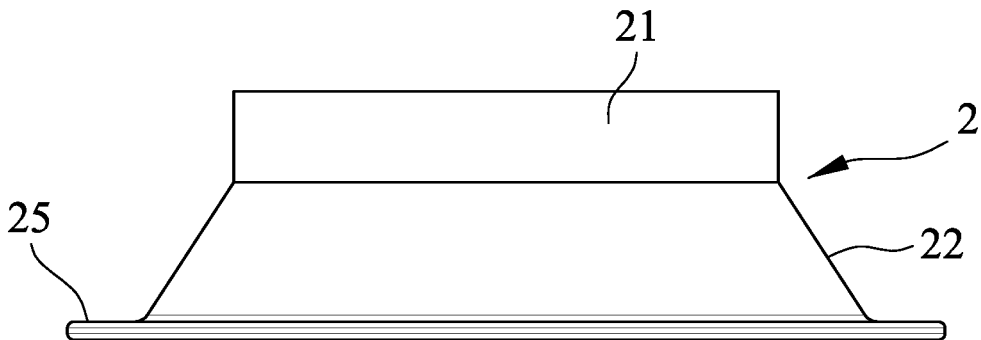
FIG. 8 is a side view of the backflow-prevention valve of a third embodiment of the disclosure.
Figure 9:
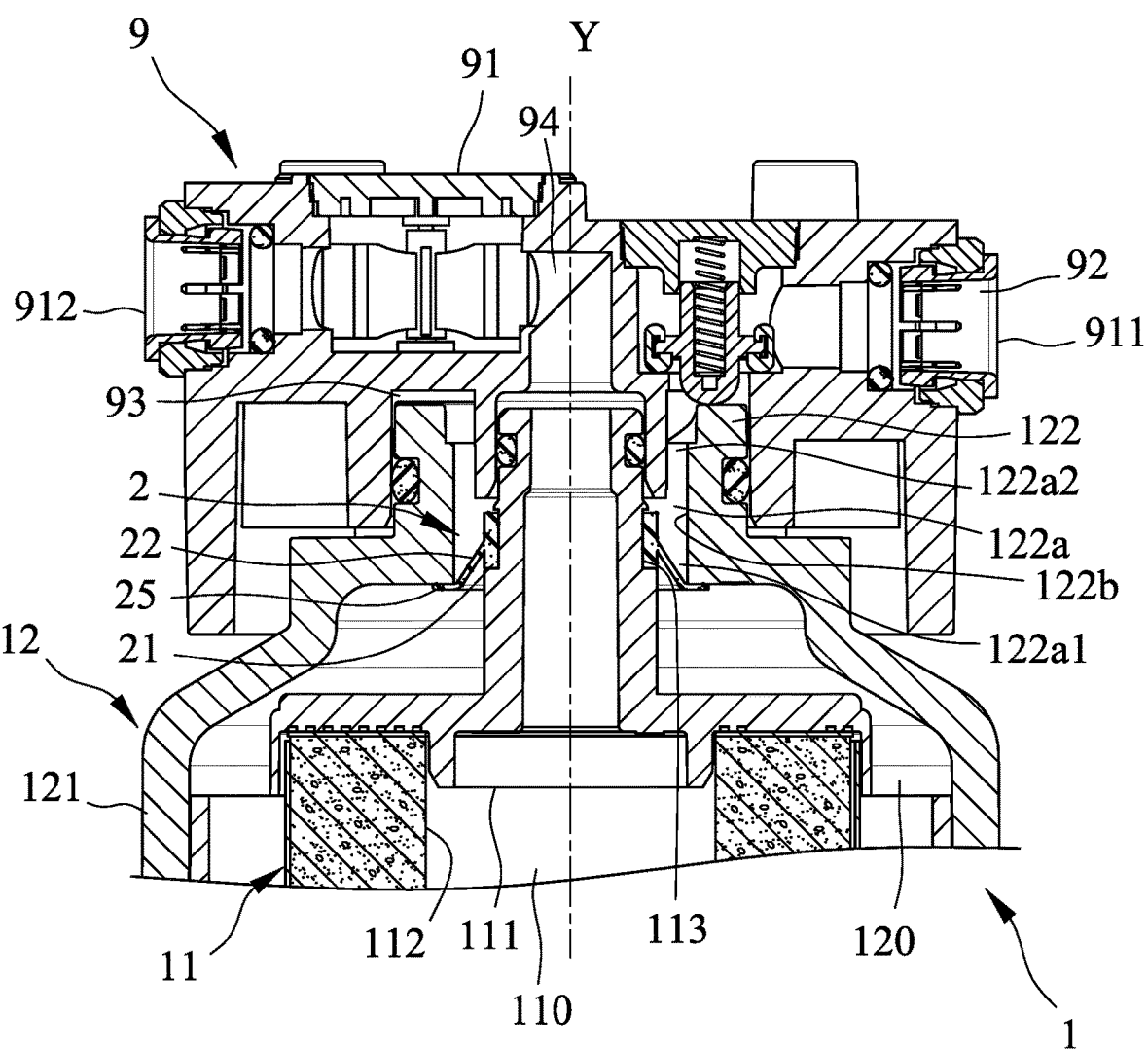
FIG. 9 is a fragmentary sectional view of the third embodiment.

Referring to FIGS. 8 and 9, a third embodiment of the backflow-preventing filter module according to the disclosure is similar to the first embodiment, the differences therebetween reside in the following. In this embodiment, the distal end of the abutting portion 22 of the backflow-prevention valve 2 is configured as an annular plate 25 that abuts against the inner surrounding wall 122*b* at a position adjacent to the lower opening 122*a*1 when the abutting portion 22 is in the closed position.

As shown in FIG. 9, when the abutting portion 22 is in the closed position, a structure of the annular plate 25 blocks the residual water in the accommodating space 120 from back flowing from the lower opening 122*a*1 into the annular slot 122*a*, thereby enhancing prevention of backflows.

In conclusion, the backflow-prevention valve 2 of the backflow-preventing filter module is made of a material that is flexible, and the flexibility of the material allows the backflow-prevention valve 2 to be moved between the open and closed positions by the waterflow. When the water flows from the raw water source through the inlet 911 and the inlet groove 92, the abutting portion 22 is moved to the open position, where the distal end of the abutting portion 22 is pushed by the waterflow to be away from the inner surrounding wall 122*b*, so that the annular slot 122*a* is not blocked; and when the abutting portion 22 is not moved by the waterflow, the abutting portion 22 is moved to the closed position, where the abutting portion 22 is expanded to abut the distal end thereof against the inner surrounding wall 122*b*, thereby blocking the annular slot 122*a*, thereby preventing spilling of the residual water in the backflow-preventing filter module.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A backflow-preventing filter module adapted to be connected to a lid, the lid having a lid body that has an inlet and an outlet, an inlet groove that is in fluid communication with the inlet for connection with a raw water source, a positioning groove that is in fluid communication with and disposed downstream of the inlet groove, and an outlet groove that is disposed downstream of the positioning groove and that interconnects the positioning groove and the outlet for outlet of filtered water therethrough, said backflow-preventing filter module comprising:

a filter unit including
a filter cartridge that has
a connector adapted to be connected to the lid body, and having an internal space that is adapted to be in fluid communication with the outlet groove,
a filtering member adapted for filtering and purifying water, and defining a filtering space that is in fluid communication with said internal space of said connector, and
an annular groove formed in said connector, and
a filter shell that encloses said filter cartridge and that defines an accommodating space accommodating said filter cartridge, said filter shell including a shell body and an connecting head that is disposed at a top of said shell body and that is adapted to be inserted fixedly into the positioning groove, said connecting head having an inner surrounding wall that defines an annular slot surrounding an axis, said annular slot having a lower opening that is in fluid communication with said accommodating space, and an upper opening that is disposed at a top of said connecting head and that is adapted to be in fluid communication with the inlet groove; and
a backflow-prevention valve sleeved on said connector and having
a fixing portion that is disposed in said annular groove, and
an abutting portion that extends outwardly from said fixing portion towards said accommodating space, and that is movable between an open position and a closed position;
wherein, when said abutting portion is in the open position, a distal end of said abutting portion opposite to said fixing portion is pushed by water, which flows from the inlet groove, to be away from said inner surrounding wall, so that said annular slot is not blocked; and
wherein, when said abutting portion is in the closed position, said abutting portion is expanded to abut said distal end thereof against said inner surrounding wall, thereby blocking said annular slot.

2. The backflow-preventing filter module as claimed in claim 1, wherein said backflow-prevention valve further has a plurality of ribs that are disposed around said fixing portion, that are spaced apart from each other, and that extend from said fixing portion to said abutting portion.

3. The backflow-preventing filter module as claimed in claim 2, wherein said backflow-prevention valve further has a recess that is formed in said abutting portion and that surrounds and is proximate to said fixing portion.

4. The backflow-preventing filter module as claimed in claim 1, wherein said backflow-prevention valve further has a recess that is formed in said abutting portion and that surrounds and is proximate to said fixing portion.

5. The backflow-preventing filter module as claimed in claim 1, wherein said distal end of said abutting portion of said backflow-prevention valve is configured as an annular plate that abuts against said inner surrounding wall at a position adjacent to said lower opening when said abutting portion is in the closed position.

6. The backflow-preventing filter module as claimed in claim 5, wherein said abutting portion is made from a flexible material.

7. The backflow-preventing filter module as claimed in claim 1, wherein said abutting portion is made from a flexible material.

8. The backflow-preventing filter module as claimed in claim 1, wherein said filter cartridge further has a protrusion protruding from said connector, disposed above said annular groove, surrounding the axis, and spaced apart from said inner surrounding wall, said protrusion having a top end that is opposite to said annular groove and that is beveled.

\* \* \* \* \*